(12) United States Patent
Klingler et al.

(10) Patent No.: US 7,370,691 B2
(45) Date of Patent: *May 13, 2008

(54) HEAT EXCHANGER AND HEATING OR AIR CONDITIONING UNIT OF A MOTOR VEHICLE CONTAINING SAID HEAT EXCHANGER

(75) Inventors: Dietrich Klingler, Heubach (DE); Klaus Voigt, Bietigheim-Bissingen (DE)

(73) Assignee: BEHR GmbH & Co., Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/139,481

(22) Filed: May 31, 2005

(65) Prior Publication Data

US 2005/0263276 A1 Dec. 1, 2005

Related U.S. Application Data

(63) Continuation of application No. 09/796,554, filed on Mar. 2, 2001, now abandoned.

(30) Foreign Application Priority Data

Mar. 2, 2000 (DE) ................. 100 10 266

(51) Int. Cl.
*F25B 29/00* (2006.01)
*F28F 3/02* (2006.01)
*B60H 1/00* (2006.01)
(52) U.S. Cl. ............ 165/43; 165/42; 165/201; 165/122; 165/151; 165/152; 165/153; 165/170; 165/164; 165/167; 165/140; 165/130; 165/166; 165/148
(58) Field of Classification Search .......... 165/42, 165/43, 140, 167, 170, 152, 153, 166
See application file for complete search history.

(56) References Cited

U.S. PATENT DOCUMENTS

| | | | |
|---|---|---|---|
| 629,223 A | 7/1899 | Walther |
| 1,170,902 A | 2/1916 | Harrison |
| 1,954,556 A | 4/1934 | Auman |
| 2,061,100 A | 11/1936 | Palmer |
| 2,117,830 A | 5/1938 | Van Der Beyl |
| 2,128,763 A | 8/1938 | Whitlark et al. |
| 2,169,993 A | 8/1939 | Booth |

(Continued)

FOREIGN PATENT DOCUMENTS

DE 25 31 015 A1 1/1977

(Continued)

*Primary Examiner*—John K. Ford
(74) *Attorney, Agent, or Firm*—Foley & Lardner LLP (57) ABSTRACT

The invention relates to a heat exchanger of a plate-type construction having first flow channels for a first medium, each formed by a pair of plates, and having corrugated ribs, around which a second medium flows, arranged between neighboring plate pairs. In order to provide an improved heat exchanger which allows a more compact construction of the plant when used in a heating or air conditioning unit of a motor vehicle, it is proposed that the corrugated ribs and at least one of the neighboring plate pairs form second flow channels for the second medium and the second flow channels have a curved course, so that the second medium undergoes a change of flow direction on flowing through the heat exchanger.

37 Claims, 9 Drawing Sheets

U.S. PATENT DOCUMENTS

| | | |
|---|---|---|
| 2,354,698 A | 8/1944 | Norris |
| 3,428,141 A * | 2/1969 | Forstner et al. ............ 180/68.1 |
| 3,490,522 A * | 1/1970 | Bizzarro ..................... 165/166 |
| 3,605,882 A * | 9/1971 | Smith et al. ................ 165/173 |
| 3,800,868 A * | 4/1974 | Berkowitz et al. .......... 165/170 |
| 4,362,208 A * | 12/1982 | Hauser ........................ 165/51 |
| 5,050,486 A | 9/1991 | Arold et al. |
| 5,180,004 A | 1/1993 | Nguyen |
| 5,511,612 A | 4/1996 | Tajima et al. |
| 6,161,616 A | 12/2000 | Haussmann |
| 6,360,817 B1 | 3/2002 | Brochin et al. |

FOREIGN PATENT DOCUMENTS

| | | |
|---|---|---|
| DE | 29 24 441 A1 | 12/1979 |
| DE | 39 25 726 A1 | 2/1991 |
| DE | 43 32 619 A1 | 3/1994 |
| DE | 198 04 389 A1 | 8/1998 |
| DE | 197 19 252 A1 | 11/1998 |
| JP | 56-149585 A | 11/1981 |
| JP | 60-149890 A | 8/1985 |
| JP | 61027496 A * | 2/1986 |
| JP | 64056227 A * | 8/1987 |
| JP | 62-202997 A | 9/1987 |
| JP | 03-133565 A | 6/1991 |
| JP | 05-001890 A | 1/1993 |
| JP | 09039553 A * | 2/1997 |
| JP | 09-323526 A | 12/1997 |
| JP | 09323526 A * | 12/1997 |
| JP | 10016532 A * | 1/1998 |
| JP | 11101591 A * | 4/1999 |

* cited by examiner

HEAT EXCHANGER AND HEATING OR AIR CONDITIONING UNIT OF A MOTOR VEHICLE CONTAINING SAID HEAT EXCHANGER

The present application is a continuation of U.S. application Ser. No. 09/796,554, filed Mar. 2, 2001, now abandoned the entire contents of which are incorporated herein by reference.

BACKGROUND OF THE INVENTION

The invention relates to a heat exchanger of a plate-type construction, and a heating or air conditioning unit for a motor vehicle equipped therewith.

An air conditioning unit as disclosed, for example, in DE 198 04 389 has an evaporator of what is referred to as a plate-type construction. The evaporator has first flow channels, each formed from a pair of plates, for a coolant of the air conditioning unit, and corrugated ribs, around which the air to be cooled flows, arranged in each case between neighboring plate pairs. Such known plate-type evaporators, as they are called, are of cuboid construction and are used in the air conditioning unit between a fan and a heating member to cool the air to be passed into the passenger compartment.

Motor vehicles today are intended to be as compact as possible in their external dimensions, the interior space being as large as possible. Accordingly, efforts are made to design increasingly compact air conditioning units, so that they take up as little structural space as possible. Designers therefore attempt to make the individual components of the air conditioning unit smaller and more efficient, as shown, for example, by DE 197 19 252, in which the evaporator described is designed such that its overall depth is no more than 50 mm.

SUMMARY OF THE INVENTION

It is an object of the invention to provide an improved heat exchanger and a heating or air conditioning unit equipped therewith which has a reduced structural volume.

According to the invention, the corrugated ribs and at least one of the neighboring plate pairs form second flow channels for a second medium, for example, for air, which flows through the heat exchanger, the second flow channels having a curved course, so that the second medium undergoes a change of flow direction on flowing through the heat exchanger. With such a heat exchanger, which no longer has to be of cuboid construction and through which the air does not flow in a linear manner, the air need not, as previously in known air conditioning units, be deflected upstream and downstream of the heat exchanger. Instead, the air is deflected directly in the heat exchanger as it flows through. The heat exchanger performs both the function of cooling or heating the air flowing through, depending on the intended purpose, and the function of guiding the air. As a result, at least to a certain extent, air deflections on the air side upstream and/or downstream of the heat exchanger can be dispensed with, and the heating or air conditioning unit, or the air guide housing of that unit, can be of more compact design.

Advantageous embodiments of the invention are described herein.

When the air undergoes a change of direction in the heat exchanger, an air inflow face and an air exit face of the heat exchanger are advantageously arranged at an angle α to one another. Preferably, the angle α is approximately 90°.

In one embodiment of the invention, the individual second flow channels are of different lengths, and it is particularly advantageous if the second flow channels become longer with increasing distances from a feed for the first medium, so that in the vicinity of the feed, where a relatively large temperature difference exists between the two media, the second flow channels are relatively short and therefore the heat exchange only needs to take place over a shorter path. At a greater distance from the feed, the temperature difference between the two media becomes smaller and therefore the flow channels are advantageously longer, so that the air, which is guided in the heat exchanger independently of the position of the second flow channel into a particular flow channel, is always brought to the same temperature level.

Advantageously, for flow purposes, the second flow channels preferably have an arcuate course, especially a circular arcuate course. As a result, pressure losses for the air are reduced, despite deflection.

The first flow channels preferably have a serpentine course in order to optimize heat exchange with the second medium.

In a structurally simple manner, the corrugated ribs may be punched from sheet metal.

If two heat exchangers are to be used, for example an evaporator and a heating member in an air conditioning unit, and the two heat exchangers are connected in series on the air side, it is advantageous if both heat exchangers are designed according to the invention and the plates of the two heat exchangers are integrally connected to one another. Then the two heat exchangers can be produced simultaneously in a single production process by jointly arranging in series and brazing the plates and corrugated ribs. In the further assembly of the air conditioning unit, also, advantages are achieved in that the heat exchangers can be simultaneously inserted as one unit into the air conditioning unit. Overall, this can save numerous assembly steps.

In order nevertheless to decouple the two heat exchangers thermally as far as possible, it is advantageous if the plates of the heat exchangers are connected to one another only in the region of their passage apertures, which in each case form collection spaces for the first medium. As a result, a further advantages also achieved that water of condensation forming in the heat exchanger which is used as an evaporator can run off better between the heat exchangers.

Particularly advantageously, the heat exchanger according to the invention can be used in a heating or air conditioning unit as an evaporator or heating member, since structural space can thus be saved in the manner already described. In this case, the air conditioning unit can either be adjustable on the water side, the flow of the first medium through the heating member being adjustable, or the heating or air conditioning unit can be adjusted on the air side, in which case a heating member bypass is provided on the air side. In an air conditioning unit which has an evaporator and/or heating member of the structure according to the invention, the air is deflected less frequently and with a reduced pressure loss and there is reduced disruption to the airflow. By adjustment on the air side, the separation of the partial flows of air downstream of the heating member will be relatively great. This means that there is less mixing of cold and warm air and the temperature differences over the cross section of the airflow downstream of the heating member are relatively great. This can be exploited in a desirable manner to pass warmer air to a foot space and a windshield and the colder air to outlets in the central plane of the vehicle.

A very compact heating or air conditioning unit is obtained if the heat exchanger or heat exchangers each divert the air through approximately 90°.

DETAILED DESCRIPTION OF THE PREFERRED EMBODIMENT

The invention is explained in detail below with reference to exemplary embodiments, and with reference to the accompanying drawings, in which.

Figure 2:
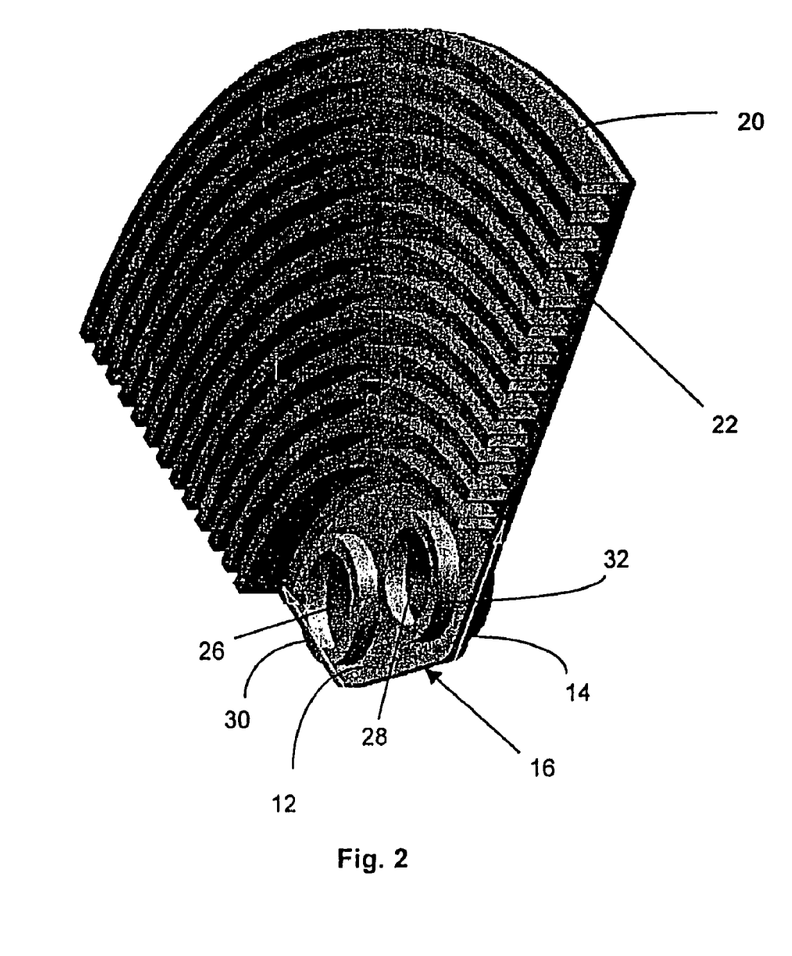
FIG. 2 shows a pair of plates with a neighboring corrugated rib.
Figure 2A:
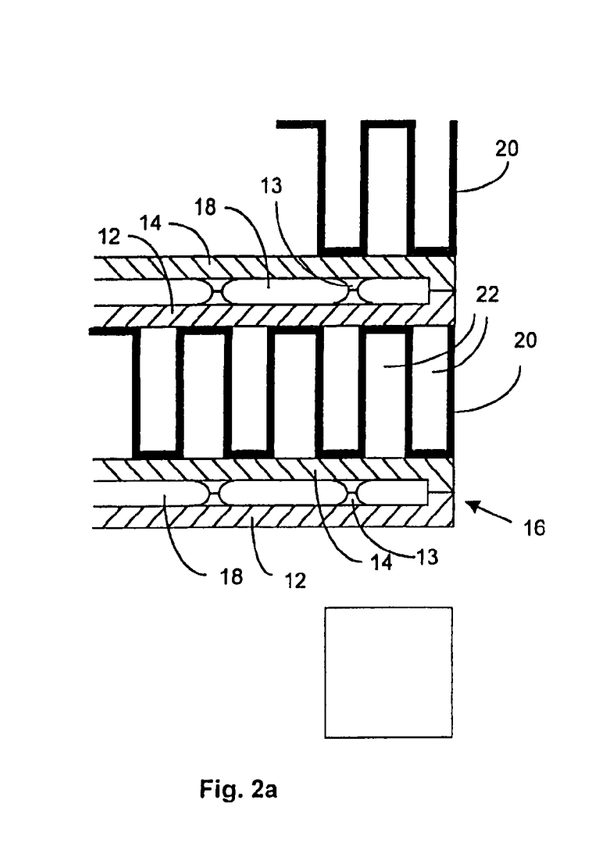
FIG. 2a shows a partial cross section in the edge region of the heat exchanger according to the invention.

A heat exchanger 10 according to the invention, as shown in the figures, has first and second plates 12 and 14, which in each case form a plate pair 16 and are connected, for example, brazed, to one another at least at the edges and thereby form first flow channels 18 between them in each case for a first medium (FIG. 2a). Corrugated ribs 20 are arranged in each case between two neighboring plate pairs 16. The corrugated ribs 20 are connected, especially brazed, to their neighboring plate pairs 16, so that the corrugated ribs 20 and at least one of the neighboring plate pairs 16 form second flow channels 22 for a second medium. In the embodiment shown, the second flow channels have a rectangular cross section because of the shape of the corrugated rib 20. Other shapes are conceivable, such as depending on the form of corrugation of the corrugated rib 20. When the first medium flows through the heat exchanger via the first flow channels and the second medium via the second flow channels, heat exchange takes place between the media.

The plates 12 and 14 have approximately the shape of a quarter-circle and have two passage apertures 26 and 28 at an end 24 facing a center of the circle, each passage aperture 26 and 28 having a collar, 30 and 32 respectively, so that in the assembled state of the heat exchanger the collars of neighboring plate pairs can be connected, especially brazed, to one another so that the mutually flush passage apertures 26 and 28 in each case form a collection space for the first medium. The first medium is fed to or removed from the heat exchanger via a feed 34 or outlet 36.

Figure 3:
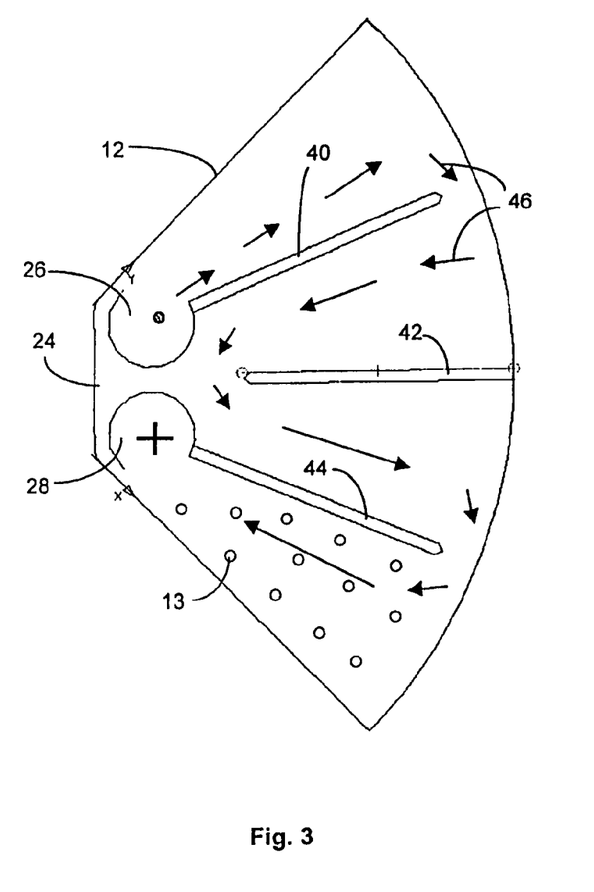
FIG. 3 shows a plan view of a plate.

The first flow channels 18 are open toward the inlet apertures 26 and outlet apertures 28, so that the first medium can flow in from the feed 34 and thus through the passage apertures 26 into all flow channels 18 in parallel and can flow from the flow channels 18 into the passage apertures 28 and to the outlet 36. Within a plate pair 16, the flow channel 18 has a serpentine course, which is produced by webs 40, 42, 44 extending radially from the passage apertures (FIG. 3). The serpentine flow course of the first medium is indicated by the arrows 46 in FIG. 3. In order to enable the flow channels 18 formed by the plates 12 and 14 to have a more pressure-stable design, knobs 13 are additionally provided, as required, these being shown only in one subarea in FIG. 3. The knobs 13 of the plates 12 and 14 are arranged opposite one another in pairs (FIG. 2) and brazed to one another, and they prevent the plates 12 and 14 from bending away or toward one another.

The second medium, which in preferred intended uses of the invention is air, flows through the second flow channels 22. Channels 22 have a curved course, especially a circular arcuate course, in accordance with the shape of the plate pairs 16 and corrugated ribs 20, so that each flow channel 22 describes a quarter-arc, the flow channels 22 having different lengths and the flow channels 22 becoming longer as the radial distance a from the passage apertures 26 and 28 respectively becomes greater (FIG. 2).

Figure 1:
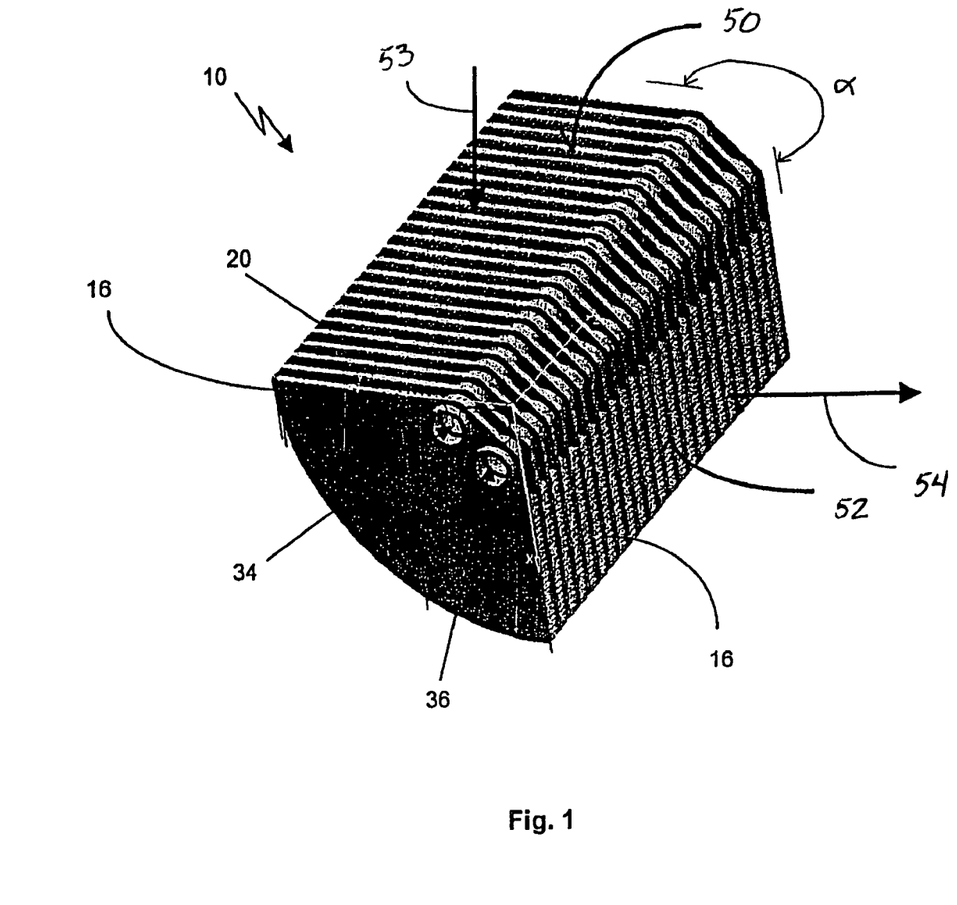
FIG. 1 shows a perspective view of a heat exchanger according to the invention.

The heat exchanger 10 according to the invention, in whose second flow channels the second medium undergoes a change of flow direction, has an inflow face 40 for the second medium, arranged at an angle α of preferably approximately 90° to an exit face 42 for the second medium, as is shown in FIG. 1, in which the airflow is represented by arrows 43 and 44. If the flow direction of the second medium is to be changed by more or less than 90° in any given application, the angle α may have a correspondingly different value.

Figure 4:
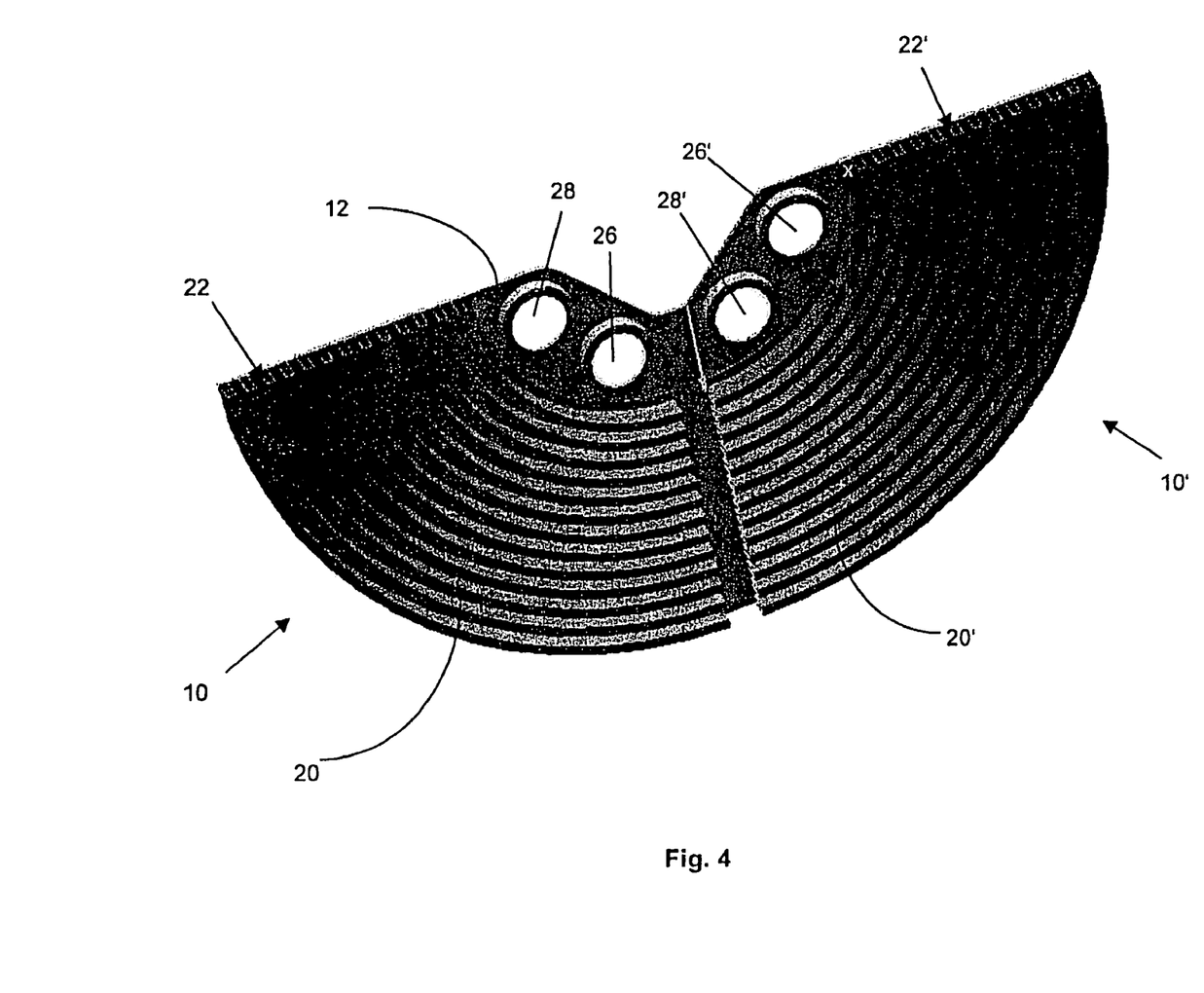
FIG. 4 shows a plate with a neighboring corrugated rib of a system consisting of two heat exchangers.
Figure 5:
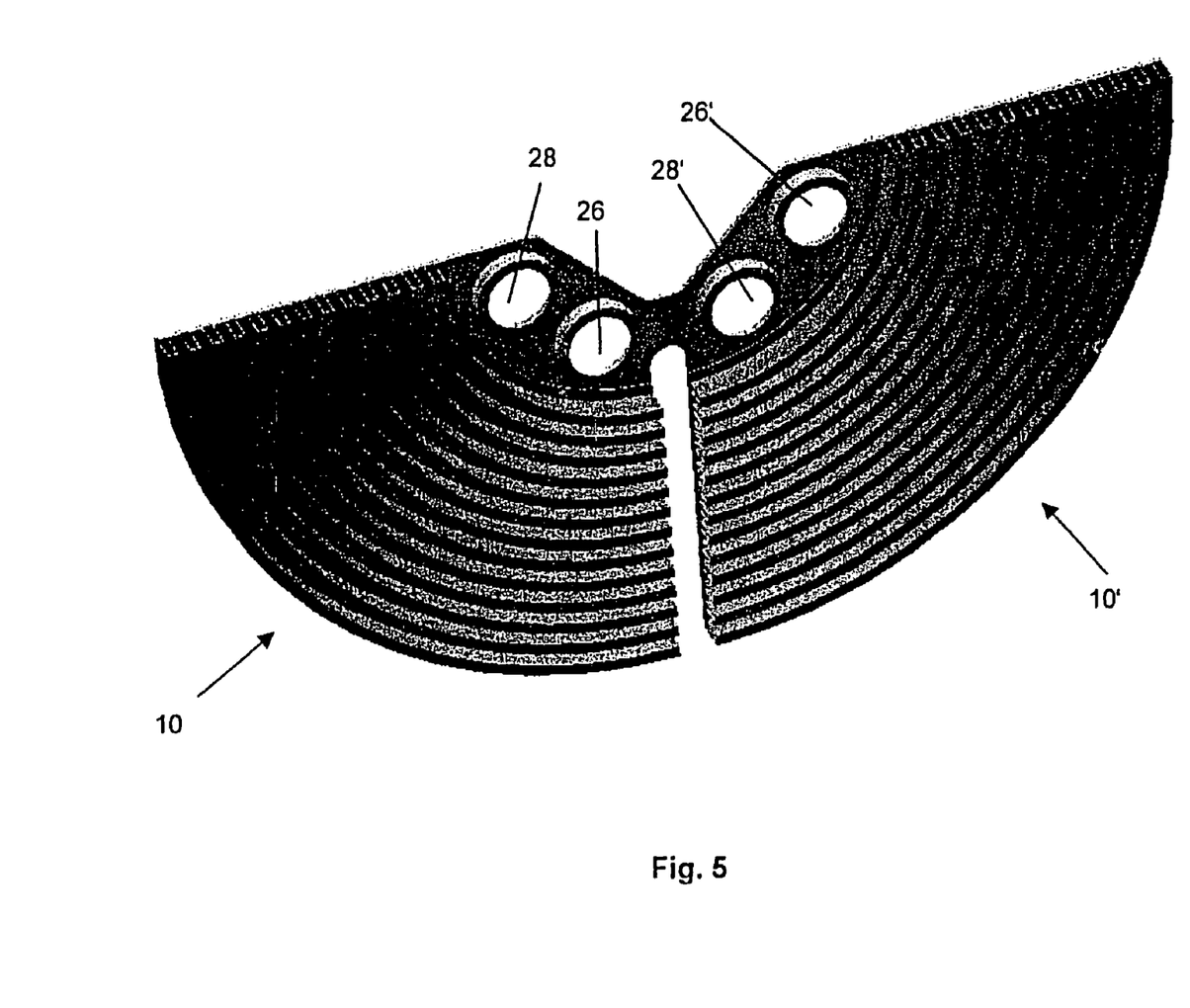
FIG. 5 shows a plate with a corrugated rib corresponding to FIG. 4 of another embodiment.

If two heat exchangers according to the invention are to be arranged in series in the flow direction of the second medium, the individual plates 12 and 14 may be connected to one another, as is shown in the embodiments according to FIGS. 4 and 5. The first flow channels of the first heat exchanger 10 should not be in fluid connection with the first flow channels of the second heat exchanger 10'. In principle, the second flow channels 22 of the first heat exchanger 10 may be integral with the second flow channels 22' of the second heat exchanger 10', the corrugated rib 20 being continuous and consisting of a single piece for the two heat exchangers 10 and 10'. However, it is advantageous for purposes of thermal decoupling for the corrugated rib to be separated into two corrugated ribs 20 and 20' for the heat exchanger 10 and for the heat exchanger 10', as shown in FIG. 4. Further thermal decoupling may be achieved if the plates 12 and 14 are connected only in the region of the passage apertures 26 and 28 or 26' and 28', respectively, as shown in FIG. 5.

Figure 6:
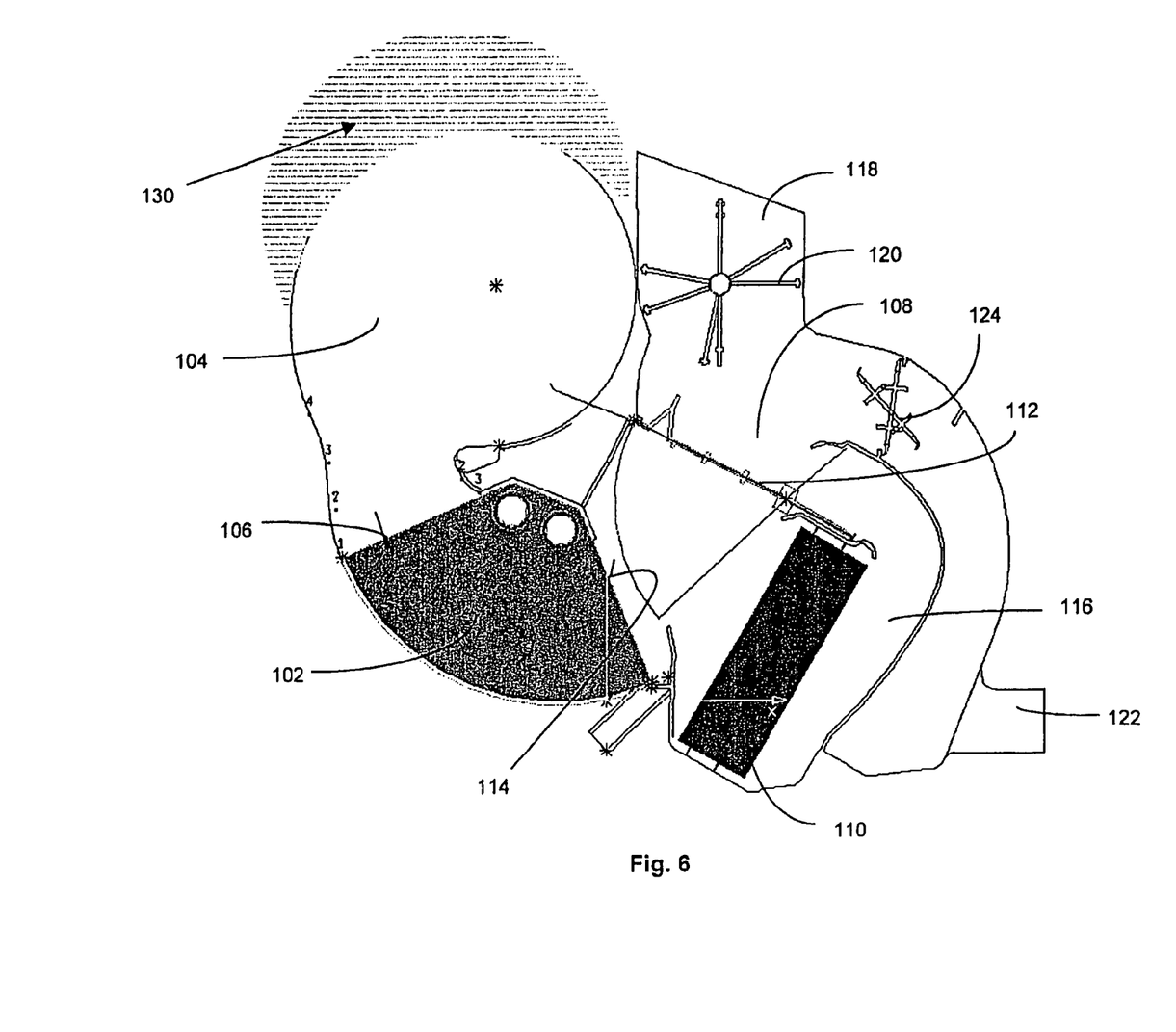
FIG. 6 shows an air conditioning unit according to the invention having a heat exchanger according to the invention as an evaporator.

The heat exchanger 10 according to the invention is preferably used in heating or air conditioning units. FIG. 6 illustrates an exemplary embodiment, in which the heat exchanger is used as an evaporator 102. Air to be conditioned is directly fed by a radial fan 104 (not shown in detail) to the inflow face 106 of the evaporator 102. In the evaporator 102, the air is cooled and simultaneously deflected in the direction of an air mixing space 108, in which the air cooled in the evaporator 102 can be mixed with air warmed in a heating member 110 of a conventional type. Via a mixing valve 112, part of the cold air emerging from the exit face 114 of the evaporator 102 can be removed toward the heating member 110 and, via a warm air channel 116, passed to the air mixing space 108 as warm air. From the air mixing space 108, some of the air is passed via a defrosting air channel 118 and a defrosting air valve 120 to the windshield.

Via a foot space air channel 122 and a foot space air valve 124, air can be fed to a foot space. An air channel for guiding air to outlets in a central plane of the passenger compartment is not specifically shown in FIG. 6, but is generally present.

The hatched surface 130 shown above the fan 104 in FIG. 6 represents the space that can be saved by using the heat exchanger 102 according to the invention instead of a conventional cuboid evaporator.

Figure 7:
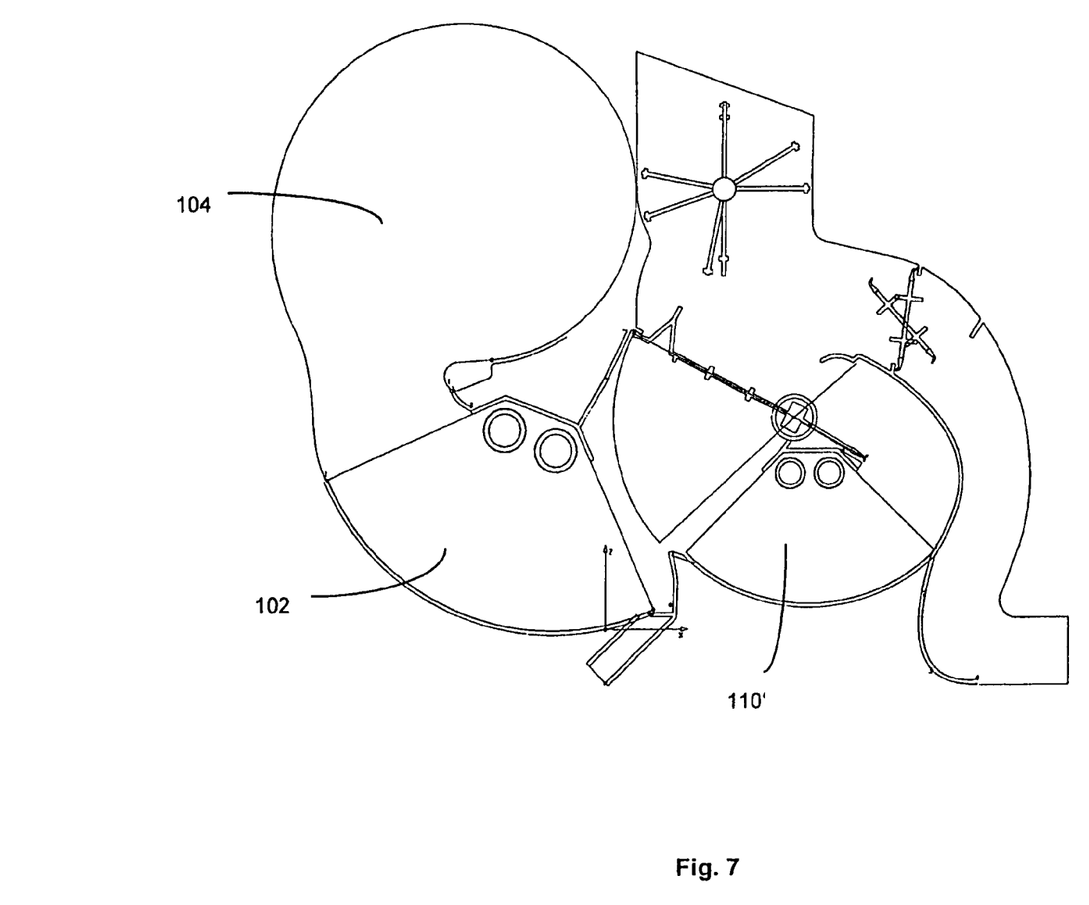
FIG. 7 shows an air conditioning unit according to the invention with an evaporator and heating member designed according to the invention.

The structural volume of the heating or air conditioning unit according to the invention can be further reduced if, as shown in FIG. 7, the heating member is also designed according to the invention and thus able not only to warm the air but also to deflect it.

Figure 8:
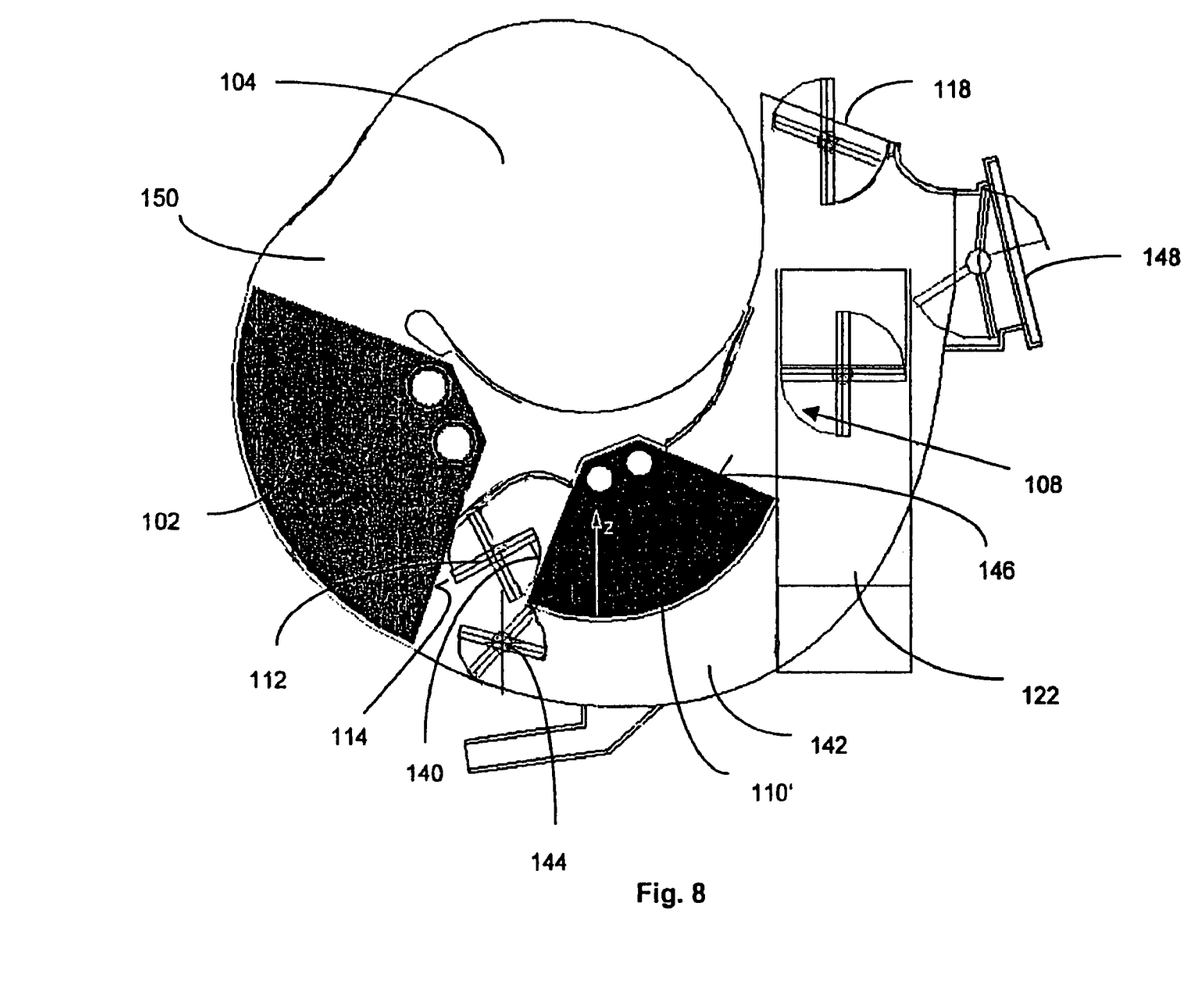
FIG. 8 shows a further embodiment of an air conditioning unit according to the invention with temperature control on the air side.

A further substantial reduction in structural volume is obtained if both the evaporator 102 and the heating member 110' are designed according to the invention, and thus not only condition the air but can also deflect it and, at the same time, are arranged in series on the airflow side, as shown in the exemplary embodiment according to FIG. 8. The evaporator 102 is installed directly downstream of the fan 104, and the heating member 110' is again fitted downstream of the evaporator 102, the inflow face 140 of the heating member 110' being aligned approximately parallel to the air exit face 114 of the evaporator 102. The second flow channels of the evaporator 102 and of the heating member 110', having a circular arcuate shape, then extend in such a way that the centers of the circles of the circular arcuate courses are approximately in alignment. In this embodiment, air is passed from the outlet 150 of the fan 104 to the air mixing space 108 on a circular arcuate path and uniformly deflected by only 180° and in a manner favoring flow, as a result of which smaller pressure losses are achieved.

A mixing valve 112 is arranged between the air inflow face 140 and the air exit face 114, and adjusts the quantity of air passed to the heating member 110'. Parallel to the heating member 110' on the airflow side is a heating member bypass 142, which can be closed via a bypass valve 144. Thus, cold air cooled in the evaporator can be guided past the heating member and passed to the air mixing space 108. The warm air emerging at the air exit face 146 of the heating member 110' likewise enters the air mixing space and can mix with the cold air present there. From the air mixing space 108, the defrosting air channel 118 branches off to the foot space air channel 122 and an air channel 148 to outlets in the central plane of the vehicle. The air channels branching off from the air mixing space 108 can in each case be shut off by means of air valves.

Figure 9:
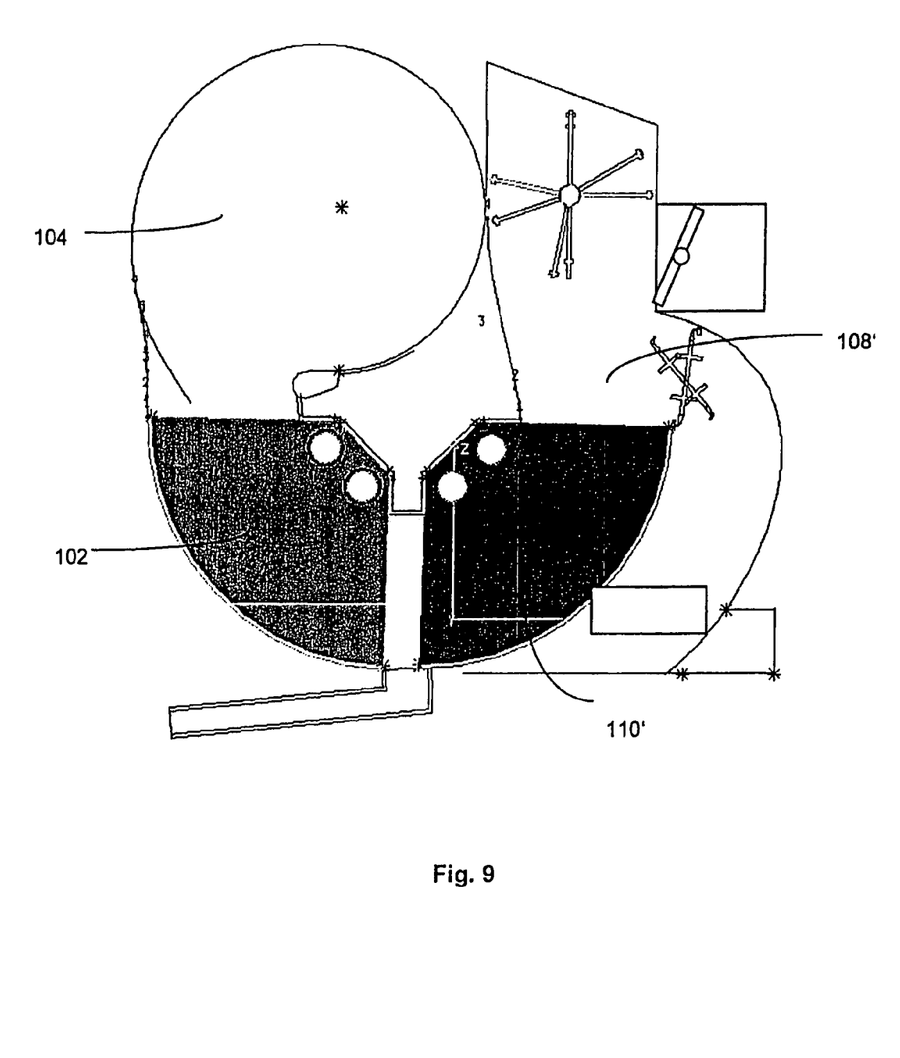
FIG. 9 shows an air conditioning unit according to the invention with temperature control on the water side.

In a further embodiment of the invention, shown in FIG. 9, the evaporator 102 and the heating member 110' are again both designed in accordance with the invention. In this case, the heating member 110' and the evaporator 102 are arranged in series on the air side without an interposed air flap. All the air initially flows through the evaporator 102 and is cooled there, and then through the heating member 110', where it is reheated as necessary. To regulate the air temperature, the flow of the first medium through the heating member 110' is adjustable. This first medium is generally the coolant of the internal combustion engine of the motor vehicle. In this embodiment of the heating or air conditioning unit according to the invention, the system of two heat exchangers designed as shown in FIGS. 4 and 5, in other words connected to one another and produced in a single production process, which was described earlier, can be used with particular advantage. In this case, again, the second flow channels of the evaporator 102 and of the heating member 110', having a circular arcuate shape, extend in such a way that the centers of the circles represented by the circular arcuate courses are approximately in alignment. In this case, again, the air is uniformly deflected by only 180° from the outlet of the radial fan 104 to the space 108' downstream of the heating member 110' on the airflow side. From the space 108', the conditioned air is passed in a known manner via air valves and the individual air channels to the passenger compartment.

German parent patent application number DE 100 10 266.2 is hereby incorporated by reference in its entirety.

The foregoing embodiments have been shown for illustrative purposes only and are not intended to limit the scope of the invention, which is defined by the claims.

We claim:

1. A heating or air conditioning unit, comprising:
   a first plate-type heat exchanger, said first plate-type heat exchanger comprising: a plurality of stacked plates, with respective adjacent plates forming pairs of plates, the plates of the pairs being joined together to define a plurality of first flow channels therebetween for carrying a first heat exchange medium;
   at least a first passage aperture for the first heat exchange medium; and
   fins arranged between neighboring pairs of said plates, said fins and at least one of said neighboring pairs of plates forming a plurality of second flow channels for carrying a second heat exchange medium,
   wherein each of said second flow channels is of increasing length with increasing radial distance from said passage aperture, wherein said first heat exchanger is an evaporator, and
   the heating or air conditioning unit further comprising a second heat exchanger arranged downstream of said evaporator,
   wherein said second heat exchanger comprises:
   a plurality of stacked plates, with respective adjacent plates forming pairs of plates, the plates of the pairs being joined together to define a plurality of third flow channels therebetween for carrying a third heat exchange medium; and
   fins arranged between neighboring pairs of said plates, said fins and at least one of said neighboring pairs of plates forming a plurality of fourth flow channels for carrying a fourth heat exchange medium;
   wherein said fins are shaped such that the fourth heat exchange medium has a general flow direction in said fourth flow channels that is changed as it flows through the second heat exchanger.

2. A heating or air conditioning unit of claim 1, wherein said second heat exchanger is a heater.

3. A heating or air conditioning unit of claim 2, wherein each of said evaporator and said heater further comprises:
   at least one passage aperture for the respective first and third heat exchange medium,
   wherein each of said second and fourth flow channels is of increasing length with increasing distance from said respective passage aperture.

4. A heating or air conditioning unit of claim 2, wherein said heater can adjust a flow of said third heat exchange medium.

5. A heating or air conditioning unit of claim 2, further comprising a bypass positioned downstream of said evaporator for allowing air to bypass said heater.

6. A heating or air conditioning unit for providing conditioned air to a confined space designed to accommodate at least one person comprising:
   a first plate-type heat exchanger, the first heat exchanger comprising: a plurality of stacked plates, with respective adjacent plates forming pairs of plates, the plates of the pairs being joined together to define a plurality of first flow channels therebetween for carrying a first heat exchange medium;

at least a first passage aperture for the first heat exchange medium;

fins arranged between neighboring pairs of said plates, said fins and at least one of said neighboring pairs of plates forming a plurality of second flow channels for carrying a second heat exchange medium comprising air;

an inflow face for said second heat exchange medium; and an exit face for said second heat exchange medium, wherein each of said second flow channels is of increasing length with increasing radial distance from said passage aperture; and at least one passage in communication with the second flow channels for conducting the air into the confined space, wherein said inflow face and said exit face are arranged at an angle between 30 and 150 degrees to one another, wherein, each of said second flow channels has an arcuate course for medium flow between the inlet face and the exit face.

7. A heating or air conditioning unit of claim 6, further comprising a blower and wherein said first heat exchanger is positioned downstream of the blower.

8. A heating or air conditioning unit of claim 7, wherein said blower comprises a radial blower.

9. A heating or air conditioning unit of claim 7, further comprising:

a filter positioned downstream of said blower, and wherein said first heat exchanger is positioned downstream of said filter.

10. A heating or air conditioning unit of claim 6, wherein said fins are corrugated fins.

11. A heating or air conditioning unit of claim 10, wherein said first flow channels have a serpentine course for medium flow.

12. A heating or air conditioning unit of claim 10, wherein said second flow channels have a partial-circular arcuate course for medium flow.

13. A heating or air conditioning unit of claim 10, wherein each of said second flow channels has an arcuate course for medium flow between the inlet face and the exit face, the arcuate course being of a substantially constant angular direction.

14. A heating or air conditioning unit of claim 6, wherein said arcuate course is of a substantially constant angular direction.

15. A heating or air conditioning unit of claim 6, wherein said inflow face and said exit face are arranged at an angle between 60 and 120 degrees to one another.

16. A heating or air conditioning unit of claim 15, wherein said fins are corrugated fins.

17. A heating or air conditioning unit of claim 16, wherein said first flow channels have a serpentine course for medium flow.

18. A heating or air conditioning unit of claim 6, wherein said inflow face and said exit face are arranged at an angle approximately 90 degrees to one another.

19. A heating or air conditioning unit of claim 6, further comprising in each pair of plates, a plurality of knobs on each said plate arranged to one another and brazed together to connect said pair of plates.

20. A heating or air conditioning unit of claim 6, wherein said first passage aperture is located in said plates and comprises an inlet for the first heat exchange medium.

21. A heating or air conditioning unit of claim 6, wherein said inflow face defines an inflow flow direction of said second heat exchange medium perpendicular to the inflow face, and said exit face defines an exit flow direction of said second heat exchange medium perpendicular to the exit face.

22. A heating or air conditioning unit of claim 6, wherein the plates are relatively thin, lightweight plates.

23. A heating or air conditioning unit of claim 6, wherein said first heat exchanger comprises a heater or an evaporator.

24. A heating or air conditioning unit of claim 23, wherein said first heat exchanger comprises an evaporator.

25. A heating or air conditioning unit of claim 23, wherein said first heat exchanger comprises a heater.

26. A heating or air conditioning unit of claim 23, further comprising at least one movable air directing member positioned downstream of the first heat exchanger in said at least one passage.

27. A heating or air conditioning unit of claim 6, wherein the at least first passage aperture is located in said plates.

28. A heating or air conditioning unit of claim 6, wherein the plurality of plates are essentially planar.

29. A heating or air conditioning unit of claim 28, wherein the plurality of plates have essentially the same shape.

30. A heating or air conditioning unit comprising:

a first plate-type heat exchanger; and a second plate-type heat exchanger, wherein each of said first and second plate-type heat exchangers comprises:

a plurality of stacked plates, with respective adjacent plates forming pairs of plates, the plates of the pairs being joined together to define a plurality of first flow channels therebetween for carrying a first heat exchange medium;

at least one passage aperture formed in said plates of said first and second heat exchangers for the first heat exchange medium carried in each respective heat exchanger; and fins arranged between neighboring pairs of said plates, said fins and at least one of said neighboring pairs of plates forming a plurality of second flow channels for carrying a second heat exchange medium, wherein each of said second flow channels is of increasing length with increasing radial distance from said passage aperture, wherein the first heat exchanger has a first outlet and the second heat exchanger has a second outlet, the first outlet being fluidly independent from the second outlet.

31. A heating or air conditioning unit of claim 30, wherein said second flow channels have arcuate paths, said arcuate paths of said second flow channels of said first heat exchanger have a first center located in at least approximately the same vicinity as a second center of said arcuate paths of said second flow channels of said second heat exchanger, and wherein said second heat exchanger is a heater.

32. A heating or air conditioning unit of claim 30, wherein each of said first and second heat exchangers diverts air through approximately ninety (90) degrees.

33. A heating or air conditioning unit of claim 32, further comprising an air mixing valve located downstream of said first heat exchanger to direct at least a portion of air exiting said first heat exchanger to said second heat exchanger.

34. A heating or air conditioning unit of claim 32, wherein said second flow channels have arcuate paths of substantially constant angular direction.

35. A heating or air conditioning unit of claim 30, wherein said first heat exchanger further comprises an exit face, and said second heat exchanger comprises an inflow face,
wherein said exit face of said first heat exchanger is aligned approximately parallel to said inflow face of said second heat exchanger.

36. A heating or air conditioning unit of claim 30, wherein said first and second heat exchangers are integrally connected to one another.

37. A heating or air conditioning unit for providing conditioned air to a confined space designed to accommodate at least one person, comprising:
   a first plate-type heat exchanger, said first plate-type heat exchanger comprising a plurality of stacked plates, with respective adjacent plates forming pairs of plates, the plates of the pairs being joined together to define a plurality of first flow channels therebetween for carrying a first heat exchange medium;
   at least a first passage aperture for the first heat exchange medium;
   fins arranged between neighboring pairs of said plates, said fins and at least one of said neighboring pairs of plates forming a plurality of second flow channels for carrying a second heat exchange medium comprising air;
   wherein each of said second flow channels is of increasing length with increasing radial distance from said first passage aperture;
   a second passage aperture for the first heat exchange medium located so that each of said second flow channels is of increasing length with increasing radial distance from both said first and second passage apertures; and
   at least one passage is in communication with the second flow channels for conducting the air into the confined space.

* * * * *